United States Patent
Yoshizumi (10) Patent No.: US 7,702,410 B2
(45) Date of Patent: Apr. 20, 2010

(54) GENERATION OF SCHEDULE BY WHICH PHYSICAL ITEMS TO BE MANUFACTURED ARE ASSIGNED INTO PRODUCTION SLOTS VIA REDUCING NON-ZERO FACTORS WITHIN COEFFICIENT MATRIX CLUSTERS

(75) Inventor: Takayuki Yoshizumi, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 347 days.

(21) Appl. No.: 11/875,937

(22) Filed: Oct. 21, 2007

(65) Prior Publication Data

US 2009/0106340 A1     Apr. 23, 2009

(51) Int. Cl.
*G05B 15/02* (2006.01)
*G06Q 10/00* (2006.01)

(52) U.S. Cl. .......................................... 700/99; 705/8

(58) Field of Classification Search .................... 700/99
See application file for complete search history.

*Primary Examiner*—Albert DeCady
*Assistant Examiner*—Sivalingam Sivanesan
(74) *Attorney, Agent, or Firm*—Vazken Alexanian (57) ABSTRACT

A schedule is generated by which physical items to be manufactured are assigned into production slots. The physical items have constraints governing manufacture of the physical items. The method generates coefficient matrix clusters from a mathematical programming problem based on an actual scheduling problem. Each coefficient matrix cluster defines a variable cluster-constraint cluster pair. A variable cluster of each coefficient matrix cluster defines production slot-physical item pairs. A constraint cluster of each coefficient matrix cluster defines a group of constraints. Each coefficient matrix cluster includes coefficient-binary variable pairs, each pair having a binary variable multiplied by a coefficient. For each coefficient matrix cluster, the method reduces non-zero factors within the cluster. Each non-zero factor within the coefficient matrix cluster is defined as a coefficient-binary variable pair such that the binary variable of the pair multiplied by the coefficient of the pair is non-zero. The schedule is then generated.

20 Claims, 5 Drawing Sheets

| 252 | EXCLUDE EACH CONSTRAINT FROM THE COEFFICIENT MATRIX CLUSTER FOR WHICH THE NUMBER OF NON-ZERO FACTORS IS LESS THAN OR EQUAL TO HALF OF THE NUMBER OF BINARY VARIABLES |

↓

| 254 | FOR EACH BINARY VARIABLE OF THE COEFFICIENT MATRIX CLUSTER, COUNT THE NUMBER OF OCCURRENCES A COEFFICIENT BY WHICH THE BINARY VARIABLE IS MOST FREQUENTLY MULTIPLIED |

↓

| 256 | WHERE THE NUMBER OF OCCURRENCES IS LESS THAN OR EQUAL TO HALF OF THE NUMBER OF CONSTRAINTS, EXCLUDE THE BINARY VARIABLE FROM THE COEFFICIENT MATRIX CLUSTER |

↓

| 258 | DEFINE A SUBSTITUTE VARIABLE AS A LINEAR COMBINATION OF A NUMBER OF COEFFICIENT-BINARY VARIABLE PAIRS THAT APPEAR MOST FREQUENTLY WITHIN THE COEFFICIENT MATRIX CLUSTER |

↓

| 260 | ADD THE SUBSTITUTE VARIABLE AS A NEW CONSTRAINT WITHIN THE COEFFICIENT MATRIX CLUSTER |

↓

| 262 | REMOVE EACH COEFFICIENT-BINARY VARIABLE PAIR DEFINED BY THE SUBSTITUTE VARIABLE FROM THE COEFFICIENT MATRIX CLUSTER |

FIG 3

|  | Variable cluster 1 | Variable cluster 2 | ... | Variable cluster $k$ | |
|---|---|---|---|---|---|
|  | $x_{11}$   $x_{12}$ ... | $x_{21}$   $x_{22}$ ... | ... | $x_{k1}$   $x_{k2}$ ... | |
| $C_{11}$: | $5x_{11} + x_{12}$ ... | $2x_{21}$ ... | ... | ... | $< 0$ |
| $C_{12}$: | $5x_{11} - 3x_{12}$ ... | $2x_{21}$ ... | ... | $x_{k1} + x_{k2}$ ... | $= 0$ |
| ... | ... | ... | ... | $3x_{k1} + x_{k2}$ ... | |
| $C_{21}$: | $4x_{11} + x_{12}$ ... | $2x_{21} - 9x_{22}$ ... | ... | ... | $= 0$ |
| $C_{22}$: | $4x_{11} + x_{12}$ ... | $x_{21} - 9x_{22}$ ... | ... | $x_{k2}$ ... | $< 0$ |
| ... | ... | ... | ... | ... | |
| $C_{l1}$: | $3x_{11}$ ... | $2x_{21} - 2x_{22}$ ... | ... | $x_{k1} + 3x_{k2}$ ... | $< 0$ |
| $C_{l2}$: | $3x_{11}$ ... | $2x_{21} - 2x_{22}$ ... | ... | $2x_{k1} + 3x_{k2}$ ... | $< 0$ |

Constraint cluster 1: $\{C_{11}, C_{12}\}$
Constraint cluster 2: $\{C_{21}, C_{22}\}$
Constraint cluster $l$: $\{C_{l1}, C_{l2}\}$

$C_1:\ 5x_1\ +\ x_2\ +\ 2x_3\ -\ 9x_4\ \phantom{+\ 2x_5}\ +\ 7x_6\ +\ x_7$
$C_2:\ 5x_1\ -\ 3x_2\ +\ 2x_3\ -\ 9x_4\ +\ 2x_5\ +\ 7x_6\ +\ 3x_7$
$C_3:\ x_1\ -\ 3x_2\ +\ 4x_3\ -\ 9x_4\ +\ 2x_5\ +\ 7x_6\ +\ x_7$
$C_4:\ 5x_1\ -\ 3x_2\ \phantom{+\ 2x_3\ -\ 9x_4\ +\ 2x_5}\ +\ 7x_6$
$C_5:\ 5x_1\ -\ 3x_2\ \phantom{+\ 2x_3}\ -\ 8x_4\ +\ 2x_5\ +\ 7x_6\ +\ x_7$

FIG 6

$C_1:\ 5x_1\ +\ x_2\ +\ 2x_3\ -\ 9x_4\ +\ 7x_6\ +\ x_7$
$C_2:\ 5x_1\ \phantom{+\ x_2}\ +\ 2x_3\ -\ 9x_4\ +\ 3x_7\ +\ y$
$C_3:\ x_1\ \phantom{+\ x_2}\ +\ 4x_3\ -\ 9x_4\ +\ x_7\ +\ y$
$C_4:\ 5x_1\ -\ 3x_2\ +\ 7x_6$
$C_5:\ 5x_1\ -\ 8x_4\ +\ x_7\ +\ y$

FIG 7

$C_1:\ 5x_1\ +\ x_2\ +\ 2x_3\ -\ 9x_4\ \phantom{+\ 2x_5}\ +\ 7x_6\ +\ x_7$
$C_2:\ 5x_1\ -\ 3x_2\ +\ 2x_3\ -\ 9x_4\ +\ 2x_5\ +\ 7x_6\ +\ 3x_7$
$C_3:\ x_1\ -\ 3x_2\ +\ 4x_3\ -\ 9x_4\ +\ 2x_5\ +\ 7x_6\ +\ x_7$
$C_4:\ 5x_1\ -\ 3x_2\ +\ 7x_6$
$C_5:\ 5x_1\ -\ 3x_2\ -\ 8x_4\ +\ 2x_5\ +\ 7x_6\ +\ x_7$

GENERATION OF SCHEDULE BY WHICH PHYSICAL ITEMS TO BE MANUFACTURED ARE ASSIGNED INTO PRODUCTION SLOTS VIA REDUCING NON-ZERO FACTORS WITHIN COEFFICIENT MATRIX CLUSTERS

FIELD OF THE INVENTION

The present invention relates generally to generating a schedule by which physical items to be manufactured are assigned into production slots, such as by solving a mathematical programming problem like an integer programming (IP) problem, a linear programming (LP) problem, or a mixed integer programming (MIP) problem. The present invention relates more specifically to solving the mathematical programming problem after non-zero factors within coefficient matrix clusters have been reduced.

BACKGROUND OF THE INVENTION

Physical items are commonly manufactured by manufacturing systems within production slots. This ensures that physical items having similar constraints that govern their manufacture are appropriately assigned to the same production slot, such that the manufacturing system in question is optimally employed to manufacture the largest number of physical items in the least amount of time at the least amount of cost, while ensuring quality, among other factors. Examples of physical items that are manufactured within production slots in this manner include steel slabs and semi-conductor devices, among other types of physical items.

Assigning physical items to be manufactured into production slots can be a difficult problem, however. As such, this problem has been represented as an integer programming (IP) problem that when solved optimally assigns the physical items into the production slots. An IP problem may be defined as the maximization or minimization of a linear objective function under constraints provided by multiple linear inequalities or linear equalities, where the variables expressed within the problem are integers.

Solving IP problems, however, has proven problematic using existing computer hardware where the IP problems are relatively large. For example, the data structure needed to represent such IP problems can require one or more gigabytes of memory. Such memory requirements often exceed the physical memory capacities of common 32-bit computer hardware, and sometimes even exceed the address space of such hardware. As such, more sophisticated and thus more expensive hardware may be required to solve these IP problems, which is disadvantageous.

For these and other reasons, therefore, there is a need for the present invention.

SUMMARY OF THE INVENTION

The present invention relates to generating a schedule by which physical items to be manufactured are assigned into production slots, by solving a mathematical programming problem like an integer programming (IP) problem, a linear programming (LP) problem, or a mixed integer programming (MIP) problem. A method of one embodiment of the invention generates coefficient matrix clusters from an IP-related problem, where the IP-related problem is itself based on an actual scheduling problem to be solved. Each coefficient matrix cluster defines a variable cluster-constraint cluster pair. A variable cluster of each coefficient matrix cluster defines a number of production slot-physical item pairs, and a constraint cluster of each coefficient matrix cluster defines a number of constraints that belong to the same type of actual constraint. Each coefficient matrix cluster includes coefficient-binary variable pairs. Each coefficient-binary variable pair has a binary variable multiplied by a coefficient. The binary variable has a value of one where a corresponding physical item is assigned to a corresponding production slot and a value of zero where the corresponding physical item is not assigned to the corresponding production slot.

The method then, for each coefficient matrix cluster, reduces a number of non-zero factors within the coefficient matrix cluster. Each non-zero factor within the coefficient matrix cluster is defined as a coefficient-binary variable pair such that the binary variable of the coefficient-binary variable pair multiplied by the coefficient of the coefficient-binary variable pair is non-zero. The method generates the schedule by which the physical items to be manufactured are assigned into the production slots by solving a programming problem in relation to the coefficient matrix clusters in which the number of non-zero factors have been reduced. The physical items are to be manufactured in accordance with the schedule within which the physical items have been assigned into the production slots. The method may further output the schedule.

A computer-readable medium of one embodiment of the invention includes one or more computer programs stored thereon to perform the method that has been described. The computer-readable medium may be a tangible medium, such as a recordable data storage medium, or an intangible medium, such as a modulated carrier signal. The output of the schedule as performed by the computer programs can include programming a manufacturing system in accordance with the schedule within which the physical items have been assigned into the production slots, where the manufacturing system manufacturing the physical items.

A manufacturing system of one embodiment of the invention includes one or more manufacturing components and a schedule-generating mechanism. The manufacturing components are to manufacture physical items within production slots in accordance with a schedule within which the physical items have been assigned into the production slots. The schedule-generating mechanism is to generate the schedule, such as by performing the method that has been described. The mechanism may be implemented in software, hardware, or a combination of software and hardware.

Embodiments of the invention provide for advantages over the prior art. By reducing the number of non-zero factors within the coefficient matrix clusters in relation to which a programming problem is solved to generate a schedule within which physical items have been assigned into production slots, embodiments of the invention reduce computing device memory requirements needed for the data structure of the problem. These memory requirements can include actual physical memory capacity as well as memory address space. As such, utilizing embodiments of the invention means that more sophisticated and expensive hardware may not be required in order to generate the schedule in question.

Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
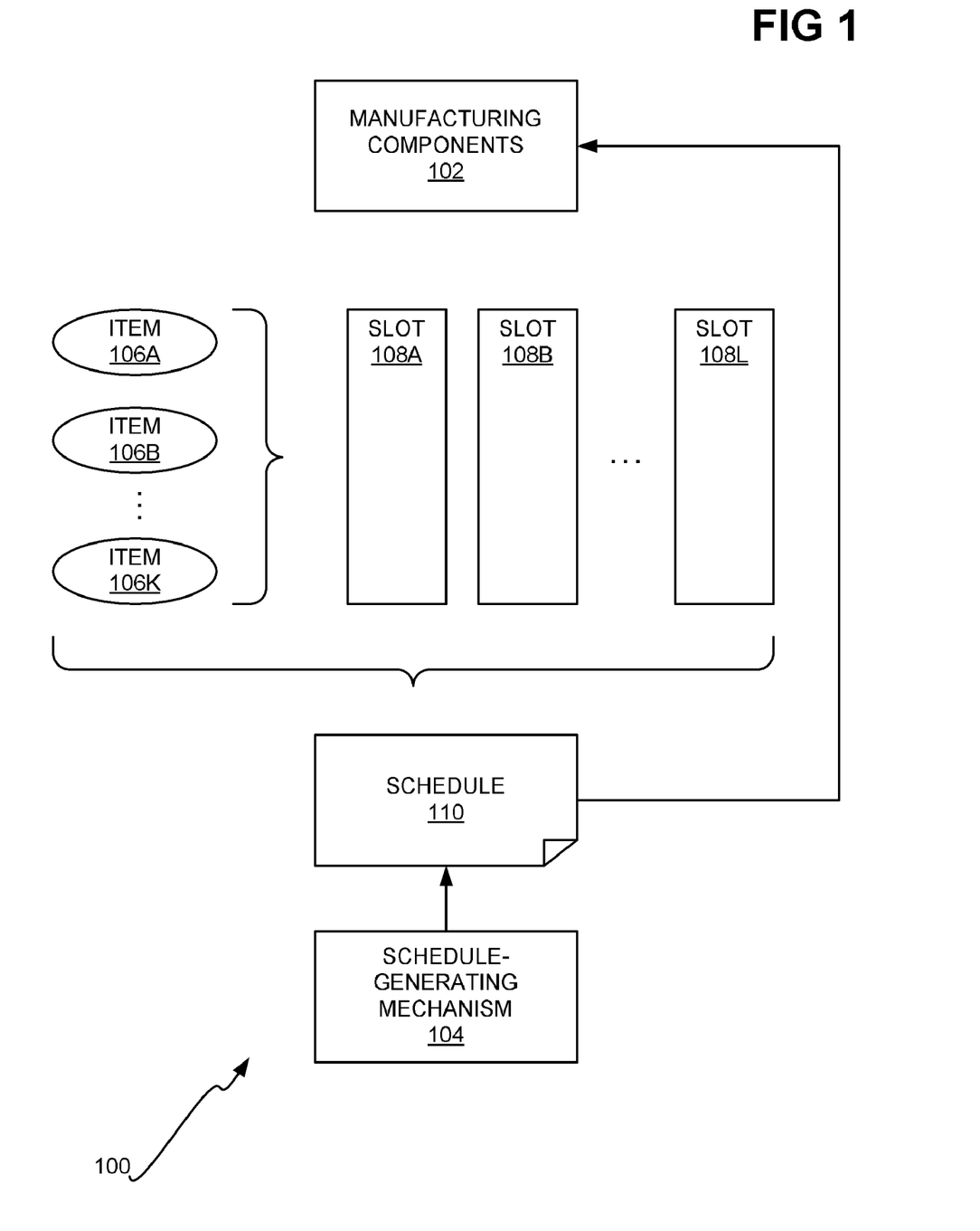
FIG. 1 is a diagram of a manufacturing system, according to an embodiment of the invention.

FIG. 1 shows a manufacturing system 100, according to an embodiment of the invention. The manufacturing system 100 includes one or more manufacturing components 102, and a schedule-generating mechanism 104. The manufacturing components 102 manufacture physical items 106A, 106B, ..., 106K, collectively referred to as the physical items 106. The physical items 106 may be steel coils, semiconductor devices, or other types of physical items.

The manufacturing components 102 manufacture the physical items 106 within a number of production slots 108A, 108B, ..., 108L, collectively referred to as the production slots 108. The production slots 108 may be considered production runs. The physical items 106 to be manufactured are assigned into the production slots 108 in accordance with a schedule 110, so that the physical items 106 are manufactured in the least amount of time at the least amount of cost, while ensuring quality, and/or among other factors. Therefore, each of the production slots 108 may have a number of the physical items 106 to be manufactured assigned to it. The manufacturing components 102 produce the physical items 106 by manufacturing all of the physical items 106 assigned to a given production slot, before manufacturing all of the physical items 106 assigned to another production slot, and so on.

The schedule-generating mechanism 104 generates the schedule 110 in accordance with which the manufacturing components 102 manufacture the physical items 106 based on the production slots 108 into which the items 106 have been assigned. The schedule-generating mechanism 104 may be implemented in software, hardware, or a combination of software and hardware. The schedule-generating mechanism 104 generates the schedule 110 by assigning the physical items 106 to be manufactured into the production slots 108. The schedule-generating mechanism 104 generates the schedule 110 by solving a mathematical programming problem, such as an integer programming (IP) problem, a linear programming (LP) problem, or a mixed integer programming (MIP) problem, as can be appreciated by those of ordinary skill within the art.

Figure 2A:
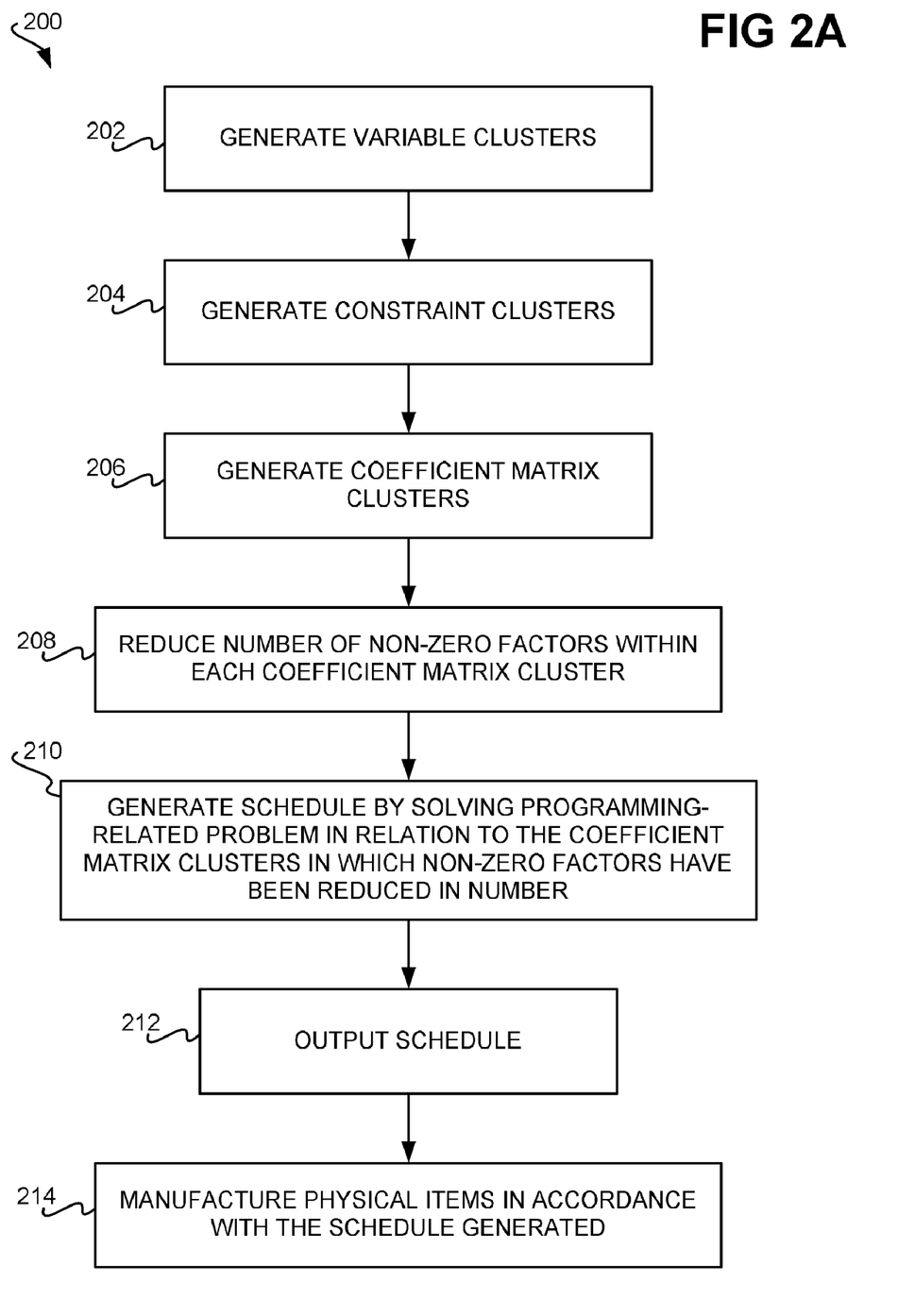
FIGS. 2A and 2B are flowcharts of a method for generating a schedule within which physical items to be manufactured are assigned into production slots, according to an embodiment of the invention.
Figure 2B:
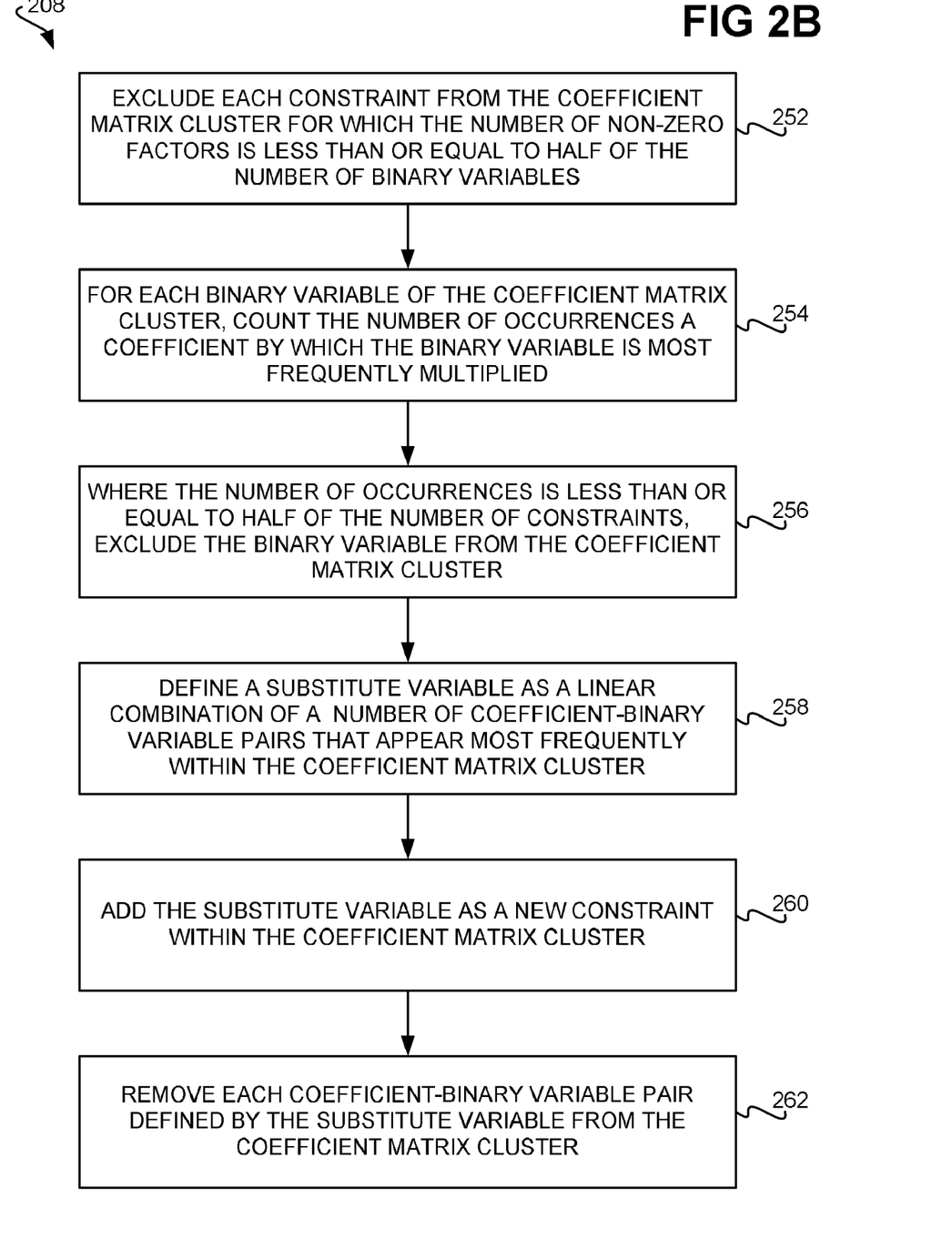

FIGS. 2A and 2B show a method 200 for generating the schedule 110, according to an embodiment of the invention, where FIG. 2B specifically shows how part 208 of FIG. 2A can be implemented. The method 200 at least in part may be performed by the schedule-generating mechanism 104. The method 200 at least in part may further be implemented as one or more computer programs stored on a computer-readable medium. These computer programs may be or implement the schedule-generating mechanism 104 in one embodiment of the invention.

Starting with FIG. 2A, a number of variable clusters are generated (202). It is noted that prior to the generation of these variable clusters, an IP, LP, or MP problem is defined from an actual scheduling-related problem to be solved. Examples of such actual, real-world scheduling-related problems have been provided in the background section, and as such, embodiments of the invention when performed provide tangible results at least in the respect that they solve such real-world scheduling-related problems. Each variable cluster may define number of physical item-production slot pairs, where there is a variable cluster for each production slot. As such, a variable cluster defines a given production slot as paired with each of the physical items to be manufactured. For instance, as just an example, a binary variable $x_{ij}$ may be defined that indicates whether a given physical item j is assigned to production slot i or not, for each i, such that $x_{i*}$ is a variable cluster.

A number of constraint clusters are also generated (204). Each constraint cluster defines a number of constraint-production slot pairs, where there is a constraint cluster for each constraint. As such, a constraint cluster defines a given constraint as paired with each of the production slots to be manufactured. More specifically, a constraint cluster defines a given constraint as paired with the physical items to be manufactured of each of the production slots as represented within each variable cluster. A constraint relates to an actual constraint such as due date constraint, product quality constraint and so on, and is represented as a mathematical statement as to a linear combination of the binary variables, with varying coefficients, such as the linear combination being greater than, equal to, or less than zero, for instance.

Thereafter, a number of coefficient matrix clusters are generated (206). Each coefficient matrix cluster defines a variable cluster-constraint cluster pair. The coefficient matrix clusters thus are subsets of the variables and the constraints. The elements of a coefficient matrix cluster may be considered the binary variables as multiplied by coefficients. Thus, each element of a coefficient matrix cluster may be, but is not necessarily, of the form $Ax_{ij}$, where A is the coefficient, and $x_{ij}$ is a binary variable.

The coefficient matrix clusters are generated in one embodiment in accordance with two conditions. First, for each constraint included in a particular coefficient matrix cluster, most of its coefficients (i.e., the coefficients of the binary variables to which the constraint in question relates) are non-zero, or most of its coefficients are zero. As such, second, for each binary variable included in a particular coefficient matrix cluster, most of its coefficients are the same, or most of its coefficients are zero. While it can be difficult to determine coefficient matrix clusters that satisfy these two conditions, those of ordinary skill within the art can appreciate that such clusters can be determined by considering the nature of the particular physical item manufacturing problem, insofar as mathematical programming problems are formulated from actual such problems in embodiments of the invention.

Figure 3:
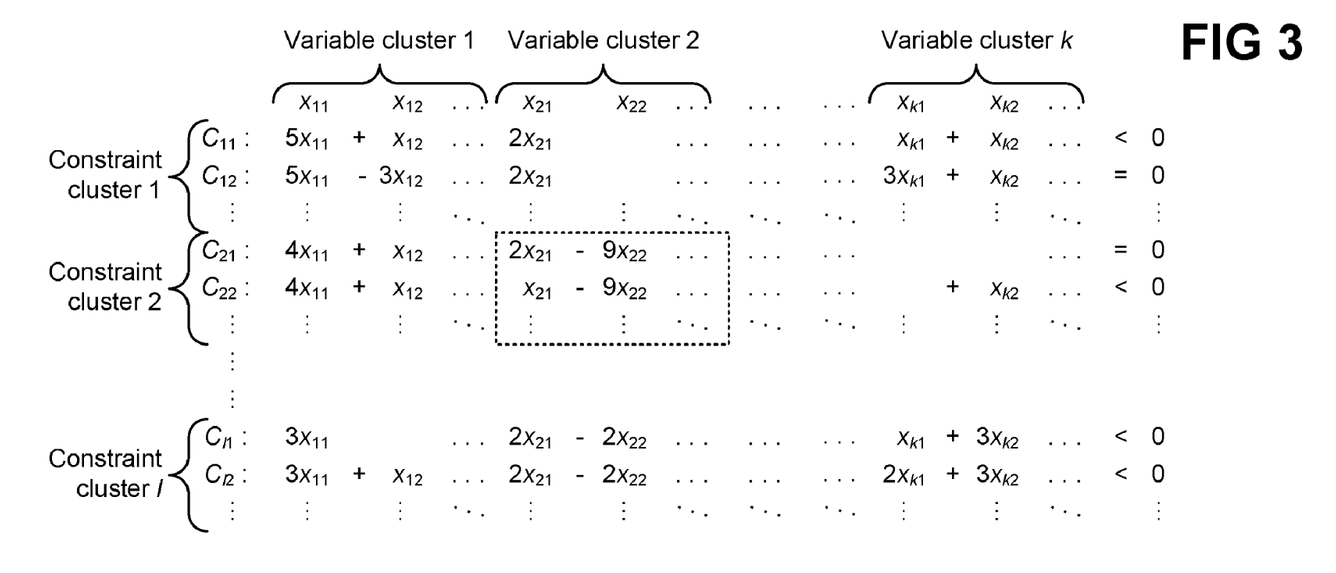
FIG. 3 is a diagram of example variable clusters, constraint clusters, and coefficient matrix clusters, according to an embodiment of the invention.

FIG. 3 shows an example of variable clusters, constraint clusters, and coefficient matrix clusters, according to an embodiment of the invention. It is noted that in FIG. 3, the subscripts i and j of $x_{ij}$ simply represent the $j^{th}$ variable of the $i^{th}$ cluster. There are k variable clusters and l constraint clusters. Each variable cluster may, but not necessarily, encompass the binary variables for the physical items to be manufactured associated with a single production slot. Each constraint $C_{yz}$ is a mathematic statement in relation to linear combination of a number of binary variables $x_{ij}$. A coefficient matrix cluster is the intersection of a variable cluster with a constraint cluster, such as the example indicated in the dotted-line box. As such, a coefficient matrix cluster is a portion of a constraint cluster as the constraint cluster intersects with a given variable cluster.

Figure 4:
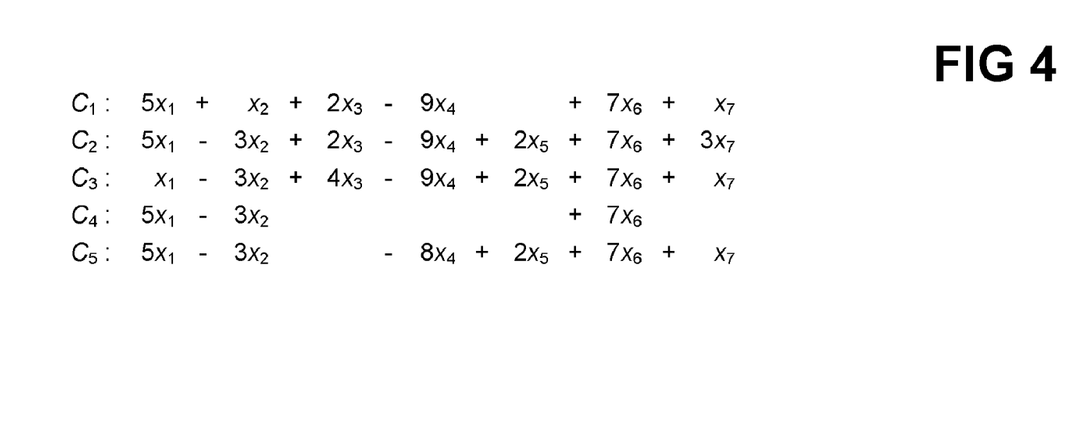
FIG. 4 is a diagram of an example coefficient matrix cluster, according to an embodiment of the invention.

FIG. 4 shows an example coefficient matrix cluster, according to an embodiment of the invention. The coefficient matrix cluster in the example of FIG. 4 encompasses five constraints. The portion of the linear combinations of these constraints included within the coefficient matrix cluster is that which is encompassed by a variable cluster. Thus, the coefficient matrix cluster is an intersection of a constraint cluster and a variable cluster. It is noted that for sake of simplicity, the subscripts have been arbitrarily renumbered in FIG. 4, starting from 1.

Referring back to FIG. 2A, the number of non-zero factors within each coefficient matrix cluster is reduced (208). Each coefficient matrix cluster includes a number of coefficient-binary variable pairs, as has been shown in FIGS. 3 and 4. The binary variable has a value of one where the physical item of the variable is assigned to the production slot of the variable, and has a value of zero where this physical item is not assigned to this production slot. A factor of a coefficient matrix cluster may be defined as a coefficient-binary variable pair such that the binary variable is multiplied by the coefficient. A non-zero factor is thus where the product of the binary variable of the pair in question multiplied by the coefficient of the pair in question is non-zero.

The schedule within which physical items to be manufactured are assigned into the production slots is then generated (210) by solving a mathematical programming problem in relation to the coefficient matrix clusters in which non-zero factors have been reduced in number. Solving such programming problems can be performed conventionally via computer, as can be appreciated by those of ordinary skill within the art. The mathematical programming problem may be an integer programming (IP) problem, a linear programming (LP) problem, a mixed integer programming (MIP) problem.

The schedule, once generated, may be output (212). Such output can include programming the manufacturing system 100 in accordance with the schedule, such that the manufacturing system 100 manufactures the physical items on a production slot-by-production slot basis using the schedule. Such output can also include printing or displaying the schedule for a user, so that the user is able to control the manufacturing system 100 in accordance with the schedule. Ultimately, then, the physical items are manufactured by the manufacturing system 100 in accordance with the schedule that has been generated (214).

FIG. 2B shows a manner by which the number of non-zero factors within each coefficient matrix cluster can be reduced in part 208, according to an embodiment of the invention. The method of FIG. 2B is performed for each coefficient matrix cluster, and thus is described in relation to one representative such coefficient matrix cluster. In one embodiment, the method of FIG. 2B can be considered as replacing one or more patterns within the coefficient matrix clusters with substitute variables, where a pattern can be defined as a number of coefficient-binary variable pairs in the form of a linear combination.

The method of FIG. 2B is described as follows. First, prior to stepping through the parts of FIG. 2B, what the method of FIG. 2B does or achieves is described in detail. Thereafter, the actual parts of FIG. 2B are described.

It is thus noted that a basic idea of data compression in general is dictionary compression, in which a pattern that appears frequently in a data set is replaced with a shorter pattern. This basic approach is applied to a coefficient matrix. Suppose that a common coefficient pattern that appears in multiple constraints is replaced by a new variable. For instance, FIG. 5, shows in its shaded regions a common pattern of the example coefficient matrix cluster of FIG. 4, according to an embodiment of the invention.

Figure 5:
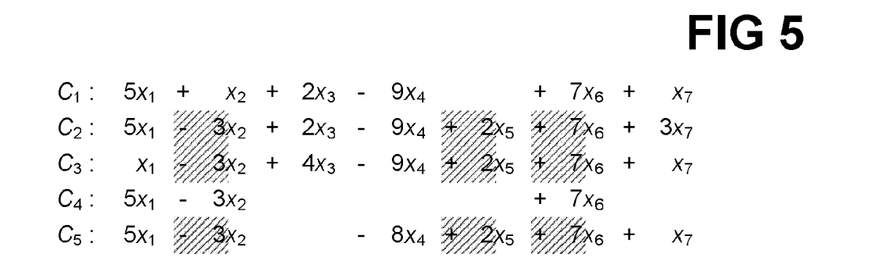
FIG. 5 is a diagram depicting a common pattern within the example coefficient matrix cluster of FIG. 4, according to an embodiment of the invention.
Figure 6:
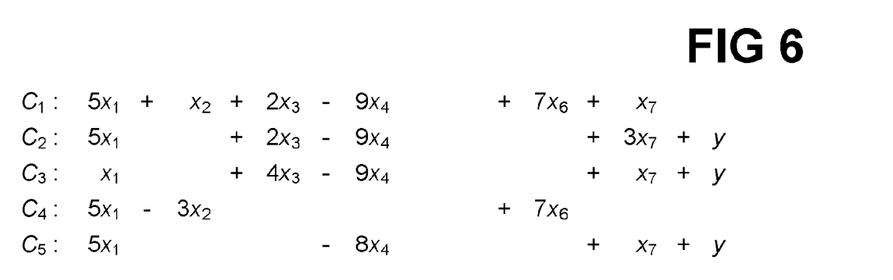
FIG. 6 is a diagram of the example coefficient matrix cluster of FIG. 4 after the common pattern depicted in FIG. 5 has been replaced with a substitute variable, according to an embodiment of the invention.

In FIG. 5, as indicated by the shaded regions, within the constraints $C_2$, $C_3$, $C_5$, the coefficients for $x_2$, $x_5$, $x_6$ are the same. Introducing a new variable y, a new constraint can be defined for $C_y$: $-3x_2+2x_5+7x_6=y$, which can be added to the IP formulation. The terms for $x_2$, $x_5$, $x_6$ for the constraints $C_2$, $C_3$, $C_5$ can then be removed, and y added to each of these constraints. These operations are mathematically equivalent. FIG. 6 shows the example coefficient matrix cluster of FIG. 4 after these operations have been performed, according to an embodiment of the invention. The number of variables and constraints has increased by one, but the number of non-zero factors has decreased to a greater degree.

When the number of variables that relate to the reduction is k and the number of constraints is l, the number of non-zero factors can be reduced by (kl−k−l−1). The more variables with the same coefficient that can be extracted from the constraints, the more non-zero factors that can be eliminated. In general, however, it may be difficult to extract subsets of the variables and constraints that maximize (kl−k−l−1) over multiple constraints. In practice, it can be reasonable to use heuristic approaches that can find an approximate solution, rather than an exact solution. Since a pattern has to be exactly the same among the constraints, the maximum values of (kl−k−l−1) will not be very much larger in some problems. In such cases, the effectiveness of embodiments of the invention may be limited.

With this basic description of the method of FIG. 2A, the specific parts of FIG. 2A are now described. These specific parts provide a solution directed to the difficulties of dictionary compression in the case of IP problems and coefficient matrix clusters. First, from the coefficient matrix cluster that is the subject of FIG. 2B, each constraint represented within the cluster for which a number of non-zero factors is less than or equal to half of a number of binary variables represented within the cluster is excluded (252). That is, constraints within the coefficient matrix are selected for later processing within the method of FIG. 2B by specifically excluding some of the constraints, such that the constraints that are not excluded are necessarily included.

The constraints that are included for later processing within the method of FIG. 2B are those for which the number of non-zero factors is greater than or equal to half of the number of variables in the cluster. In the example coefficient matrix cluster of FIG. 4, for instance, those constraints for which the number of non-zero factors is less than or equal to three are excluded from later processing, because the number of variables within the cluster is seven. Just $C_4$ is excluded in this example.

Next, the binary variables and their coefficients that will be candidates for reduction are selected. Specifically, for each binary variable of the coefficient matrix cluster, the number of occurrences a coefficient by which the binary variable is most frequently multiplied is counted (254). That is, for each binary variable, the coefficient that appears most frequently is selected and its number of occurrences counted. Where this number of occurrences is less than or equal to half of the number of constraints, then the binary variable in question is excluded from the coefficient matrix cluster (256). That is, if the frequency of occurrences of such a coefficient for a binary variable is less than or equal to half of the number of constraints within the coefficient matrix cluster, then the binary variable is excluded from further processing within the method of FIG. 2B.

Figure 7:
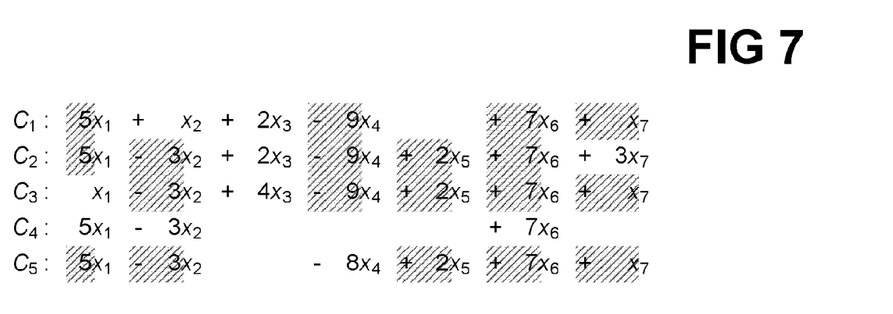
FIG. 7 is a diagram depicting the components that appear most frequently within each binary variable of the example coefficient matrix cluster of FIG. 4, according to an embodiment of the invention.

In the example coefficient matrix cluster of FIG. 4, for instance, the number of constraints that are candidates for reduction is four, because $C_4$ has already been excluded. Those variables having frequency of occurrence less than or equal to two are thus excluded in parts 254 and 256 from further processing within the method of FIG. 2B. In this example, $x_3$ is excluded because is frequency of occurrence is two. FIG. 7 therefore shows in its shaded regions the components that appear most frequently within each binary variable of the example coefficient matrix cluster of FIG. 4, according to an embodiment of the invention.

Next, a substitute variable is defined as a linear combination of a number of coefficient-binary variable pairs that appear most frequently within the coefficient matrix cluster (258). This substitute variable is added as a new constraint to the coefficient matrix cluster (260). Likewise, each coefficient-binary variable pair defined by the substitute variable is removed from the coefficient matrix cluster (262).

Figure 8:
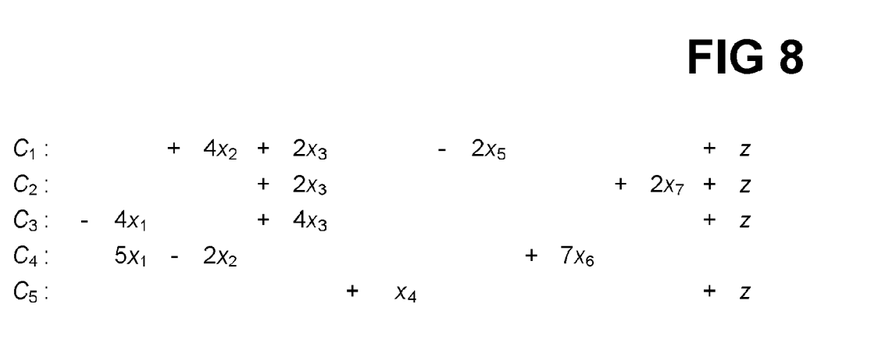
FIG. 8 is a diagram of the example coefficient matrix cluster of FIG. 4 after a substitute variable has been removed, the substitute variable has been added to the cluster, and each coefficient-binary variable pair defined by the substitute variable removed from the cluster, according to an embodiment of the invention.

For example, relation to the coefficient matrix cluster of FIG. 4 that has been discussed throughout, a new variable z may be introduced, and defined as a linear combination of the variables that are candidates for reduction and their coefficients that appear most frequently: $C_z$: $5x_1 - 3x_2 - 9x_4 + 2x_5 + 7x_6 + x_7 = z$. This constraint is added to the IP problem under consideration, the variable z is added to each constraint that is a candidate for reduction, and the non-zero factors with coefficients that appear most frequently are removed. FIG. 8 shows the example coefficient matrix cluster of FIG. 4 after these operations have been performed, according to an embodiment of the invention. It is noted that the reason why some variables and constraints are excluded before reduction is that this transformation may increase the number of non-zero factors if they are not specifically excluded.

Thus, by performing the method of FIG. 2A, one part of which specifically being implemented as depicted in and described relation to FIG. 2B, it is possible to efficiently reduce the non-zero factors among many constraints by defining new constraints as linear combinations that exploit the coefficients that appear most frequently It is noted that the number of non-zero factors that can be reduced in accordance with embodiments of the invention is in fact larger than the number that can be reduced by dictionary compression alone. As has also been noted, the approaches of embodiments of the invention can be applied to linear programming (LP) problems, and mixed integer programming (MIP) problems, as well as integer programming problems.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof

I claim:

1. A method for generating a schedule by which a plurality of physical items to be manufactured are assigned into a plurality of production slots, the physical items having a plurality of constraints governing manufacture of the physical items, the method comprising:

generating a plurality of coefficient matrix clusters from a mathematical programming problem that is based on an actual scheduling problem to be solved, each coefficient matrix cluster defining a variable cluster-constraint cluster pair, a variable cluster of each coefficient matrix cluster defining a number of production slot-physical item pairs, a constraint cluster of each coefficient matrix cluster defining a number of constraints that are of a same type, wherein each coefficient matrix cluster comprises a plurality of coefficient-binary variable pairs, each coefficient-binary variable pair having a binary variable multiplied by a coefficient, the binary variable having a value of one where a corresponding physical item is assigned to a corresponding production slot and a value of zero where the corresponding physical item is not assigned to the corresponding production slot;

for each coefficient matrix cluster, reducing a number of non-zero factors within the coefficient matrix cluster, each non-zero factor within the coefficient matrix cluster defined as a coefficient-binary variable pair such that the binary variable of the coefficient-binary variable pair multiplied by the coefficient of the coefficient-binary variable pair is non-zero; and, generating the schedule, using a computer, by which the physical items to be manufactured are assigned into the production slots by solving the IP-related problem in relation to the coefficient matrix clusters in which the number of non-zero factors have been reduced, wherein the physical items are to be manufactured in accordance with the schedule within which the physical items have been assigned into the production slots.

2. The method of claim 1, further comprising:

generating a plurality of variable clusters, each variable cluster defining a number of physical item-production slot pairs; and, generating a plurality of constraint clusters, each constraint cluster defining a number of constraints that are of a same type.

3. The method of claim 1, further comprising manufacturing the physical items in accordance with the schedule within which the physical items have been assigned into the production slots.

4. The method of claim 1, wherein, for each coefficient matrix cluster, reducing the number of non-zero factors within the coefficient matrix cluster comprises replacing one or more patterns within the coefficient matrix cluster with substitute variables, each pattern defined as a plurality of coefficient-binary variable pairs.

5. The method of claim 1, wherein, for each coefficient matrix cluster, reducing the number of non-zero factors within the coefficient matrix cluster comprises:
excluding each constraint represented within the coefficient matrix cluster for which a number of non-zero factors is less than or equal to half of a number of binary variables represented within the coefficient matrix cluster.

6. The method of claim 5, wherein, for each coefficient matrix cluster, reducing the number of non-zero factors within the coefficient matrix cluster comprises:
for each binary variable represented within the coefficient matrix cluster,
counting a number of occurrences a coefficient by which the binary variable is most frequently multiplied within the coefficient matrix cluster; and,
where the number of occurrences is less than or equal to half of a number of constraints within the coefficient matrix cluster, excluding the binary variable from the coefficient matrix cluster.

7. The method of claim 6, wherein, for each coefficient matrix cluster, reducing the number of non-zero factors within the coefficient matrix cluster comprises:
defining a substitute variable as a linear combination of a number of the coefficient-binary variable pairs that appear most frequently within the coefficient matrix cluster;
adding the substitute variable as a new constraint within the coefficient matrix cluster; and,
removing from the coefficient matrix cluster each coefficient-binary variable pair defined by the substitute variable.

8. The method of claim 1, wherein the mathematical programming problem solved in relation to the coefficient matrix clusters in which the number of non-zero factors have been reduced comprises one of: an integer programming (IP) problem, a linear programming (LP) problem, and a mixed integer programming (MIP) problem.

9. The method of claim 1, wherein the physical items to be manufactured are steel coils.

10. The method of claim 1, wherein the physical items to be manufactured are semiconductor devices.

11. A computer-readable medium having one or more computer programs stored thereon to perform a method for generating a schedule by which a plurality of physical items to be manufactured are assigned into a plurality of production slots, the physical items having a plurality of constraints governing manufacture of the physical items, the method comprising:
generating a plurality of coefficient matrix clusters, each coefficient matrix cluster defining a variable cluster-constraint cluster pair, a variable cluster of each coefficient matrix cluster defining a number of production slot-physical item pairs, a constraint cluster of each coefficient matrix cluster defining a number of constraints that are of a same type,
wherein each coefficient matrix cluster comprises a plurality of coefficient-binary variable pairs, each coefficient-binary variable pair having a binary variable multiplied by a coefficient, the binary variable having a value of one where a corresponding physical item is assigned to a corresponding production slot and a value of zero where the corresponding physical item is not assigned to the corresponding production slot;
for each coefficient matrix cluster, reducing a number of non-zero factors within the coefficient matrix cluster, each non-zero factor within the coefficient matrix cluster defined as a coefficient-binary variable pair such that the binary variable of the coefficient-binary variable pair multiplied by the coefficient of the coefficient-binary variable pair is non-zero;
generating the schedule by which the physical items to be manufactured are assigned into the production slots by solving a mathematical programming problem in relation to the coefficient matrix clusters in which the number of non-zero factors have been reduced,
wherein the mathematical programming problem comprises one of: an integer programming (IP) problem, a linear programming (LP) problem, and a mixed integer programming (MIP) problem; and,
outputting the schedule,
wherein the physical items are to be manufactured in accordance with the schedule within which the physical items have been assigned into the production slots.

12. The computer-readable medium of claim 11, wherein outputting the schedule comprises programming a manufacturing system in accordance with the schedule within which the physical items have been assigned into the production slots, the manufacturing system manufacturing the physical items.

13. The computer-readable medium of claim 11, wherein outputting the schedule comprises printing or displaying the schedule for a user so that the user is able to control a manufacturing system in accordance with the schedule within which the physical items have been assigned into the production slots, the manufacturing system manufacturing the physical items.

14. The computer-readable medium of claim 11, wherein, for each coefficient matrix cluster, reducing the number of non-zero factors within the coefficient matrix cluster comprises:
excluding each constraint represented within the coefficient matrix cluster for which a number of non-zero factors is less than or equal to half of a number of binary variables represented within the coefficient matrix cluster.

15. The computer-readable medium of claim 14, wherein, for each coefficient matrix cluster, reducing the number of non-zero factors within the coefficient matrix cluster comprises:
for each binary variable represented within the coefficient matrix cluster,
counting a number of occurrences a coefficient by which the binary variable is most frequently multiplied within the coefficient matrix cluster; and,
where the number of occurrences is less than or equal to half of a number of constraints within the coefficient matrix cluster, excluding the binary variable from the coefficient matrix cluster.

16. The computer-readable medium of claim 15, wherein, for each coefficient matrix cluster, reducing the number of non-zero factors within the coefficient matrix cluster comprises:
defining a substitute variable as a linear combination of a number of the coefficient-binary variable pairs that appear most frequently within the coefficient matrix cluster;
adding the substitute variable as a new constraint within the coefficient matrix cluster; and, removing from the coefficient matrix cluster each coefficient-binary variable pair defined by the substitute variable.

17. A manufacturing system comprising:

one or more manufacturing components to manufacture a plurality of physical items within a plurality of production slots in accordance with a schedule within which the physical items have been assigned into the production slots; and, a schedule-generating mechanism to generate the schedule by:

generating a plurality of coefficient matrix clusters, each coefficient matrix cluster defining a variable cluster-constraint cluster pair, a variable cluster of each coefficient matrix cluster defining a number of production slot-physical item pairs, a constraint cluster of each coefficient matrix cluster defining a number of constraint-production slot pairs, wherein each coefficient matrix cluster comprises a plurality of coefficient-binary variable pairs, each coefficient-binary variable pair having a binary variable multiplied by a coefficient, the binary variable having a value of one where a corresponding physical item is assigned to a corresponding production slot and a value of zero where the corresponding physical item is not assigned to the corresponding production slot;

for each coefficient matrix cluster, reducing a number of non-zero factors within the coefficient matrix cluster, each non-zero factor within the coefficient matrix cluster defined as a coefficient-binary variable pair such that the binary variable of the coefficient-binary variable pair multiplied by the coefficient of the coefficient-binary variable pair is non-zero; and, generating the schedule by which the physical items to be manufactured are assigned into the production slots by solving a mathematical programming problem in relation to the coefficient matrix clusters in which the number of non-zero factors have been reduced, wherein the mathematical programming problem comprises one of: an integer programming (IP) problem, a linear programming (LP) problem, and a mixed integer programming (MIP) problem.

18. The manufacturing system of claim 17, wherein, for each coefficient matrix cluster, reducing the number of non-zero factors within the coefficient matrix cluster comprises:

excluding each constraint represented within the coefficient matrix cluster for which a number of non-zero factors is less than or equal to half of a number of binary variables represented within the coefficient matrix cluster.

19. The manufacturing system of claim 18, wherein, for each coefficient matrix cluster, reducing the number of non-zero factors within the coefficient matrix cluster comprises:

for each binary variable represented within the coefficient matrix cluster, counting a number of occurrences a coefficient by which the binary variable is most frequently multiplied within the coefficient matrix cluster; and, where the number of occurrences is less than or equal to half of a number of constraints within the coefficient matrix cluster, excluding the binary variable from the coefficient matrix cluster.

20. The manufacturing system of claim 19, wherein, for each coefficient matrix cluster, reducing the number of non-zero factors within the coefficient matrix cluster comprises:

defining a substitute variable as a linear combination of a number of the coefficient-binary variable pairs that appear most frequently within the coefficient matrix cluster;

adding the substitute variable as a new constraint within the coefficient matrix cluster; and, removing from the coefficient matrix cluster each coefficient-binary variable pair defined by the substitute variable.

\* \* \* \* \*